United States Patent [19]

Meuser

[11] 4,189,169
[45] Feb. 19, 1980

[54] SEAT BELT FASTENING DEVICE

[75] Inventor: Klaus Meuser, Wolfsburg, Fed. Rep. of Germany

[73] Assignee: Volkswagenwerk Aktiengesellschaft, Wolfsburg, Fed. Rep. of Germany

[21] Appl. No.: 848,595

[22] Filed: Nov. 4, 1977

[30] Foreign Application Priority Data

Nov. 10, 1976 [DE] Fed. Rep. of Germany ...... 2651265

[51] Int. Cl.² ............................................. B60R 21/10
[52] U.S. Cl. ..................................... 280/802; 280/808; 297/468; 297/469
[58] Field of Search ....................... 280/745, 744, 747; 297/468, 483, 469

[56] References Cited

U.S. PATENT DOCUMENTS

| 3,836,172 | 9/1974 | Hilderbrandt | 280/745 |
| 3,993,328 | 11/1976 | Henderson | 280/747 |

FOREIGN PATENT DOCUMENTS

| 2147676 | 3/1973 | Fed. Rep. of Germany. |
| 2412766 | 9/1975 | Fed. Rep. of Germany. |
| 2435767 | 5/1976 | Fed. Rep. of Germany. |
| 2298456 | 1/1975 | France. |

Primary Examiner—Robert R. Song
Attorney, Agent, or Firm—Brumbaugh, Graves, Donohue & Raymond

[57] ABSTRACT

A seat belt fastening device is designed for use with a safety belt which is attached to a vehicle door. The device is provided with a first plate mounted to the door and extending parallel to the door edge in the direction of door closing and a second plate mounted to the vehicle column adjacent the door. The first plate is connected with the safety belt and, upon closing of the door, enters into a force transmitting relation to the second plate on the door column structure, so that forces on the safety belt can be transmitted to the vehicle column.

2 Claims, 3 Drawing Figures 4,189,169

SEAT BELT FASTENING DEVICE

BACKGROUND OF THE INVENTION

This invention relates to apparatus for fastening a safety belt to the door of a vehicle, and particularly to such apparatus, which is arranged to engage the column of the vehicle upon closing of the door, so that forces on the safety belt may be applied to the vehicle column as well as the frame of the door.

Prior U.S. Pat. No. 3,836,172, which is assigned to the same assignee as the present invention, discloses a safety belt fastening apparatus which includes a retaining bolt provided with an enlarged collar which engages a corresponding slot in a plate mounted to the vehicle door column. When the door is closed, forces applied to the safety belt are coupled to the vehicle column by means of the collar on the retaining bolt.

One problem with the prior arrangement, using a collar bolt, is that a relatively small force transmitting area exists between the bolt collar and the plate attached to the vehicle column. In addition, large structural tolerances associated with the vehicle door mounting must be overcome in aligning the retaining bolt with the corresponding slot in the plate attached to the door. A small change in the level of the vehicle door relative to the vehicle column can cause the retaining bolt to strike the retaining plate. Another problem with this arrangement is that during operation of the vehicle any vibration of the vehicle door with respect to the vehicle column will cause the retaining bolt to strike the sides of the slot in which it is engaged causing undesirable noise during the operation of the vehicle.

It is therefore an object of the present invention to provide a new and improved design for a safety belt fastening apparatus, wherein there is provided a larger force transfer area between the belt retaining member and the plate attached to the vehicle column.

It is another object of the invention to provide such an apparatus which can accommodate larger tolerances in the alignment of the vehicle door and will eliminate undesired rattling noises, which may occur during the operation of the vehicle.

SUMMARY OF THE INVENTION

In accordance with the present invention, there is provided an apparatus for coupling a safety belt, of the type adapted to be fastened at one end to a frame of a pivotable door of a motor vehicle, in force transmitting relation to the door column structure associated with the vehicle door. The apparatus includes a first plate mounted on the door frame and having a first arm freely extending parallel to the direction of door closing at a selected distance from the adjacent surface on the door frame. There is also provided means connecting the safety belt with the first plate. A second plate is mounted to the door column for receiving the first plate in force transmitting relation as the door is closed.

The first plate preferably includes a second arm extending perpendicular to the first arm and having an edge butted against the door frame structure. The first plate may be mounted to the door frame by the use of screws with bushings provided surrounding the screws and spacing the plate from the adjacent surface of the door frame.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
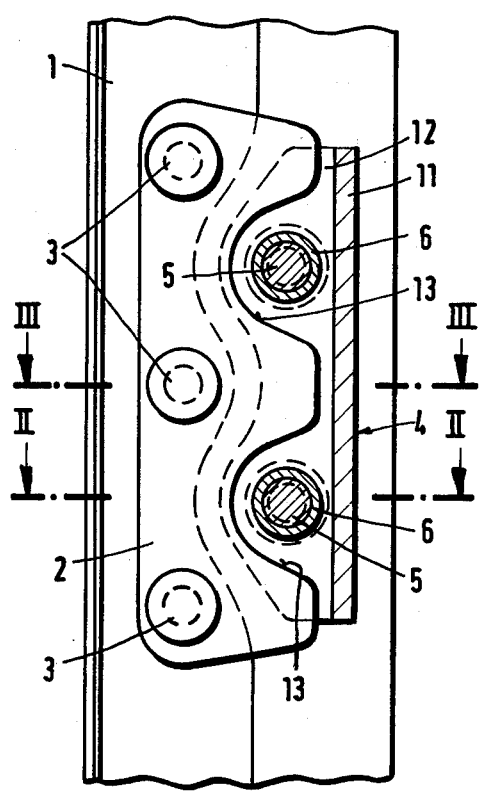
FIG. 1 shows a safety belt fastening apparatus in accordance with the present invention.
Figure 2:
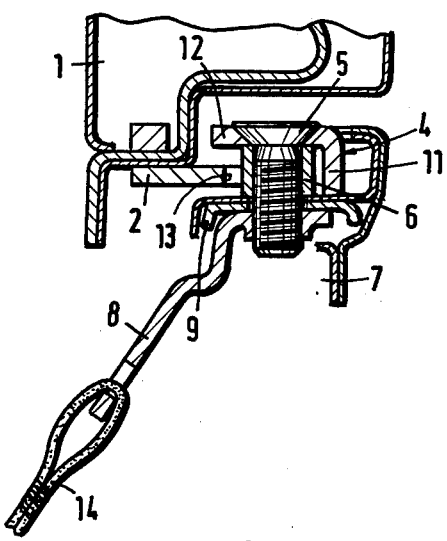
FIGS. 2 and 3 are cross-sectional views illustrating the detailed construction of the FIG. 1 apparatus.
Figure 3:
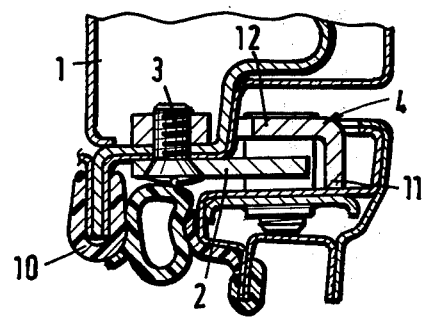

Referring to the drawings of FIGS. 1, 2, and 3 there is shown a safety belt fastening apparatus in accordance with the present invention. The apparatus includes a first plate 4, which is connected to the frame 7 of a vehicle door and is adapted to be engaged in force transmitting relation to a second plate 2, which is mounted by bolts 3 to the column 1 of the vehicle. Plate 2 could alternately be mounted by welding or riveting. As may be seen in FIG. 2, first plate 4 is mounted by bolts 5 to the frame 7 of the vehicle door. In the construction illustrated, a bushing 6 is provided between the outer arm 12 of plate 4 and the outer surface of the vehicle door frame 7. Bolts 5 are threaded into a safety belt retaining hook 8 which engages belt 14. A stiffening plate 9 is provided between safety belt retaining hook 8 and the frame members of the vehicle door, to reinforce the door frame structure.

First plate 4 includes a first arm 12 and a second arm 11, which is perpendicular to first arm 12 and butts against the surface of the vehicle door frame 7. Arm 12 extends parallel to the adjacent surface of the door frame in a direction corresponding to the direction of door closing and is spaced from the door frame. There may be provided between the edge of the door frame and the adjoining door pillar a door sealing strip, such as a rubber strip 10 illustrated in FIG. 3. Plate 4 is mounted to frame 7 and hook 8 by countersunk screws 5. Screws 5 are provided with bushings 6 to maintain the separation between plate 4 and frame 7.

The FIG. 1 view illustrates the shaping of the first plate which is attached to the door frame. The freely extending arm 12 of plate 4 extends behind second plate 2 when the vehicle door is closed. The outer edge of the extended arm 12 is curved to conform to the shape of the surface on which plate 2 is mounted. The freely extending edge of plate 2 is likewise shaped to accommodate fastening screws 5 and their corresponding bushing sleeves 6. The slots 13 into which the screws and bushings are received are widely curved and tapered toward the free edge of the plate 2 so that even upon a considerable amount of vibrational door movement in the vertical direction, or a considerable amount of tolerance in door mounting, the screws 5 and bushings 6 are not inclined to strike plate 2 and cause undesired rattling noises. As may be seen in FIG. 1, the slots into which the screws are received are symmetrically tapered so that the parts used to construct the safety belt fastening apparatus of the invention are symmetrically arranged and can be used for the doors on either the left or the right side of the vehicle. The prior art arrangements of this type, which were provided with limited head sizes for engagement behind the retaining plate could not be provided with such a widely tapered slot on the retaining plate because of the need for the plate to engage the collar of the screw holding the safety belt. Between the slots 13 provided on plate 2 for receiving the screws and bushings, there are provided extensions of the plate which engage plate 4 over a rather large surface area. This large surface area engaging structure provides increased strength for force transmission between the safety belt connecting member 8 and plate 2 which is mounted to the column of the vehicle. The comparatively large area of surface contact between plate 4 and plate 2 is maintained even if there is a tolerance build up which results in an alignment error between the two plates. Thus, even with relatively large receiving slots 13 in plate 2, a large area of surface contact between the first plate 4 and second plate 2 is maintained.

It should be recognized that the fastening apparatus of the present invention is manufactured from relatively simple components, such as flat metal plate stampings, standard screws, and standard bushings. Consequently, the device can be readily manufactured by conventional techniques at a relatively low cost. In particular, the previously known design requires the manufacture of specially machined collar screws, which become engaged behind the retaining plate on the door column. The present invention makes use of standard flat head screws and easily manufactured metal stampings.

While there has been described what is believed to be the preferred embodiment of the invention, those skilled in the art will recognize that other and further modifications may be made thereto without departing from the spirit of the invention, and it is intended to claim all such embodiments as fall within the true scope of the invention.

I claim:

1. Apparatus for coupling a safety belt, of the type adapted to be fastened at one end to a frame of a pivotal door of a motor vehicle, in force transmitting relation to the door column structure associated with said vehicle door, comprising a first plate mounted on said door frame and having a first arm freely extending parallel to the direction of door closing at a selected distance from the adjacent surface on said door frame, means connecting said safety belt with said first plate, and a second plate mounted to said door column and having portions for receiving said first plate in force transmitting relation when said door is closed, wherein said first plate includes a second arm extending perpendicular to said first arm and having an edge butted against said adjacent door frame.

2. Apparatus for coupling a safety belt, of the type adapted to be fastened at one end to a frame of a pivotal door of a motor vehicle, in force transmitting relation to the door column structure associated with said vehicle door, comprising a first plate mounted on said door frame and having a first arm freely extending parallel to the direction of door closing at a selected distance from the adjacent surface on said door frame, means connecting said safety belt with said first plate, and a second plate mounted to said door column and having portions for receiving said first plate in force transmitting relation when said door is closed, wherein said first plate is mounted to said door frame by screws and wherein bushings are provided, surrounding said screws and spacing said first plate from said adjacent surface.

* * * * *